Patented June 3, 1924.

1,496,229

UNITED STATES PATENT OFFICE.

WILLIAM JONES, OF NEW YORK, N. Y., ASSIGNOR TO VESTA M. JONES, OF NEW YORK, N. Y.

FILTERING MEDIUM.

No Drawing.   Application filed June 22, 1921.   Serial No. 479,686.

*To all whom it may concern:*

Be it known that I, WILLIAM JONES, a subject of Great Britain, and residing at 11 Wadsworth Ave., New York, in the county and State of New York, have invented a new and useful Improvement in a Filtering Medium, of which the following is a specification.

My invention relates to a filtering medium which can be used in place of bone-black, to remove the color and the mineral contents from solutions, such as sugar, in the process of refining.

My improved filtering medium is composed of calcium phosphate and calcium carbonate, impregnated with carbon in an active form. This compound is made synthetically, as hereinafter described.

Heretofore it has only been possible to remove the color, except by the use of bone-black which also absorbs a large proportion of the soluble mineral matter. The color can easily be removed by the use of active carbon, but this carbon has no action upon the mineral matter in the solution, thus it has not been possible to produce a substance to take the place of bone-black.

In my improved medium I produce, practically, a synthetic bone-black, having the same properties and texture, and capable of doing the same work as the natural product, with these exceptions. Bone black contains sulphates, chlorides and carbonates. The sulphates and chlorides are a detriment having no action and although small pass into solution and to this extent adds to the mineral contents. The carbonates act somewhat differently; they react with the calcium sulphate in the liquor forming an insoluble calcium carbonate and a soluble alkaline sulphate, which passes into solution, thus while the carbonates remove a small portion of the lime, they replace it with the alkali, and in the case of potash or soda we would get a small increase in the mineral contents, while with lithium carbonate we would have a decrease, but the expense would be prohibitive. For these reasons I prefer to leave these ingredients out.

My improved medium is formed as follows; tri-calcium phosphate is formed by precipitating a soluble calcium salt with a soluble alkali-metal phosphate in the usual and well known manner, but keeping the calcium salt in excess, as soon as the phosphate has all been formed, an alkali-metal carbonate is added, and calcium carbonate is formed, and a complete mixture of the two compounds is made; this compound precipitate is filtered off and washed to remove all soluble salts; it is then dried. This gives a substance having a hard and crystalline structure, and is very porous; this is then ground to the desired fineness after which it is mixed with a carbonaceous material, such as starch, dextrine, glue, tar or pitch, and calcined.

The proportion of calcium carbonate and carbon to the phosphate may vary very widely, that giving good results is carbonate from 6% to 12%, and carbon from 5% to 8%.

The calcium phosphate and carbon may be used without the calcium carbonate but the results are not as good as when the carbonate is added.

Having described my invention, I claim:

1. A method of preparing a filtering medium as herein described which consists in precipitating a calcium salt in solution with an alkali-metal phosphate, and an alkali-metal carbonate, washing this precipitate to remove all soluble salts, drying the washed precipitate, then grinding it to the required fineness, then mixing with it a carbonaceous substance and calcining it.

2. A filtering medium, composed of tri-calcium phosphate, calcium carbonate and an active carbon prepared by precipitating a calcium salt in solution with an alkali-metal phosphate, and an alkali-metal carbonate, washing the precipitate to remove all soluble salts, drying the washed precipitate, then grinding it to the required fineness, then mixing it with a carbonaceous substance and calcining.

WILLIAM JONES.